Figure 1:
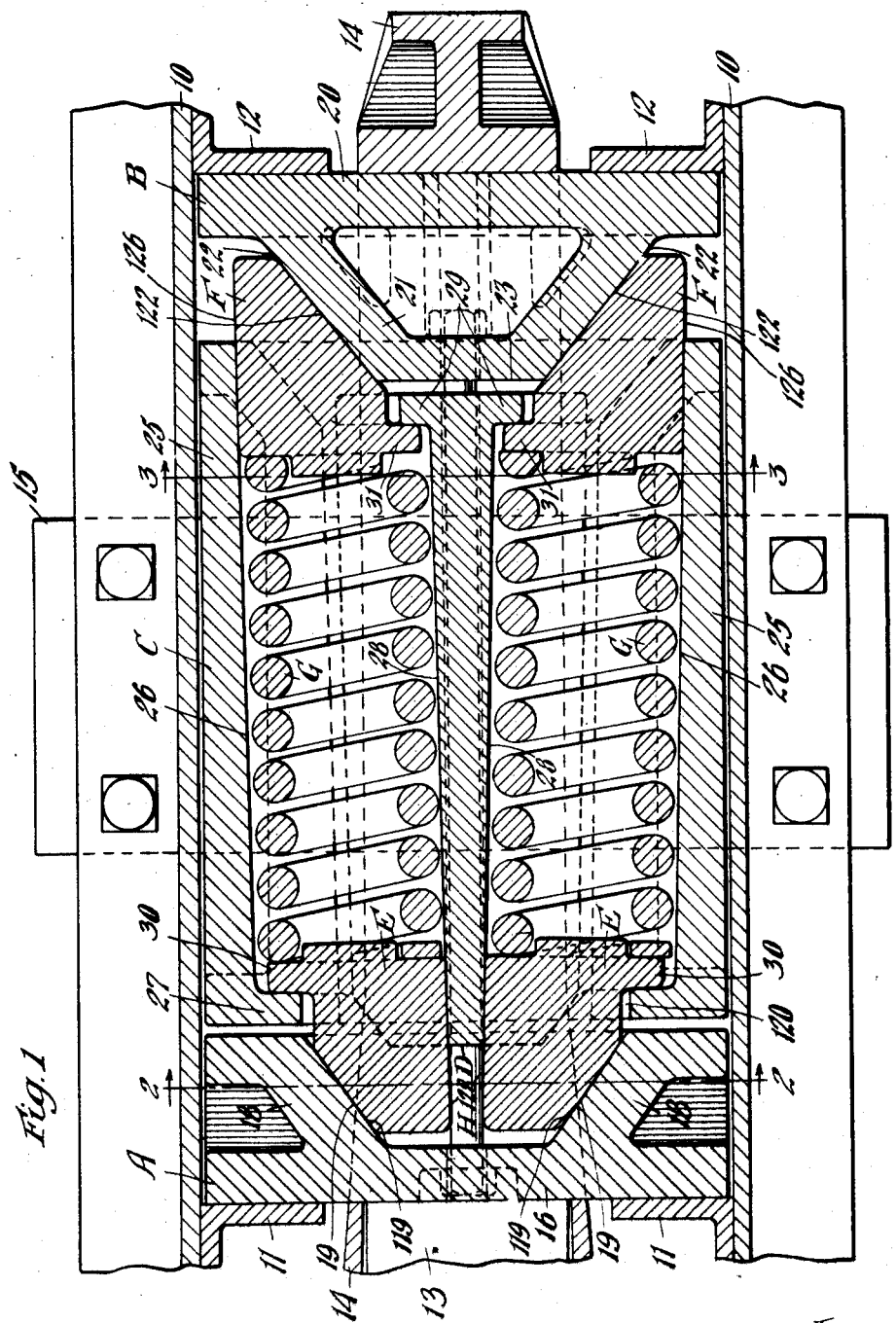

Feb. 28, 1928. 1,661,145
S. B. HASELTINE
FRICTION SHOCK ABSORBING MECHANISM
Original Filed Sept. 12, 1925   2 Sheets-Sheet 1

Witness
Wm. Geiger

Inventor
Stacy B. Haseltine
By George I. Haight
His Atty.

Feb. 28, 1928.
S. B. HASELTINE
1,661,145
FRICTION SHOCK ABSORBING MECHANISM
Original Filed Sept. 12, 1925   2 Sheets-Sheet 2
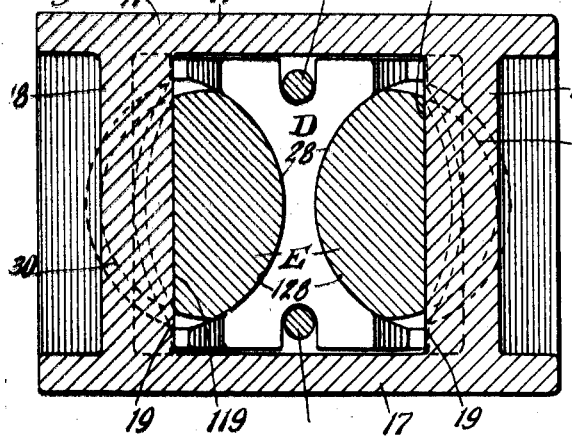
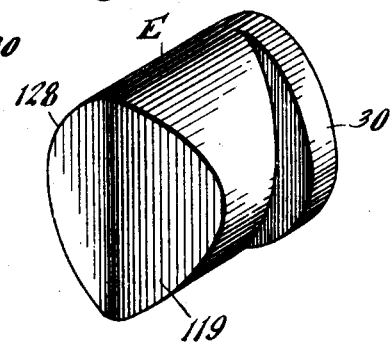
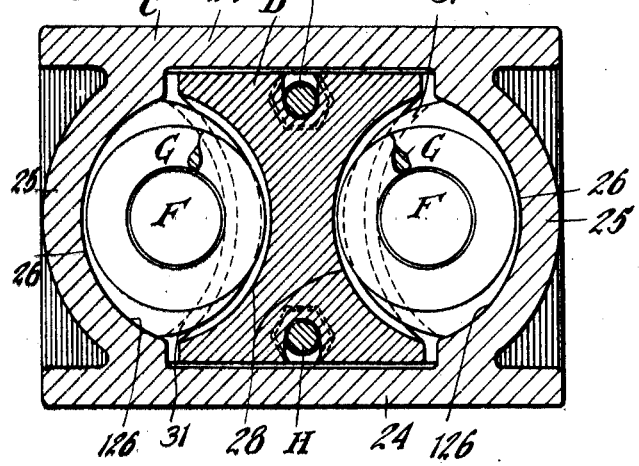
Witness
Wm. Geiger
Inventor
Stacy B Haseltine
By George I Haight
His Atty.

Patented Feb. 28, 1928.

1,661,145

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed September 12, 1925, Serial No. 55,918. Renewed June 30, 1927.

This invention relates to improvements in friction shock absorbing mechanisms.

One object of the invention is to provide a high capacity friction shock absorbing mechanism especially designed for railway draft riggings, having preliminary spring action to absorb the light shocks, followed by relatively high frictional resistance to absorb the heavier shocks, wherein is also assured easy and certain release.

A more specific object of the invention is to provide a mechanism of the character indicated, including relatively movable follower elements having wedging engagement with sets of friction shoes co-operating respectively with a friction shell and a friction post, to effect high resistance, wherein the followers are movable relatively to the post and shell respectively to a limited extent during a portion of the compression stroke to provide for preliminary light spring action to absorb light shocks.

Other objects and advantages of the invention will more fully and clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figure 4 is a detailed, perspective view of a friction shoe used in connection with my improved mechanism.

In said drawings, 10—10 indicate channel-shaped center or draft sills of a railway car underframe, to the inner surfaces of which are secured front stop lugs 11—11 and rear stop lugs 12—12. The inner end portion of the drawbar is designated by 13, to which is operatively connected a cast hooded yoke 14 of well-known form. The shock absorbing mechanism proper is operatively supported within the yoke and the yoke 14 in turn is supported by a detachable saddle plate 15, suitably fixed to the draft sills.

The improved shock absorbing mechanism, as shown, comprises broadly, a front follower A; a rear follower B; a friction shell C; a friction post D; a front pair of friction shoes E—E; a rear pair of friction shoes F—F; twin arranged main spring resistance elements G—G; and a pair of retainer bolts H—H.

The front follower A is in the form of a hollow casing having a transverse front end wall 16, horizontally disposed spaced, top and bottom walls 17—17; and vertically disposed side walls 18—18 diverging inwardly of the mechanism. The front wall 16 co-operates directly with the stop lugs 11 in the manner of the usual front follower. As most clearly shown in Figure 1, the follower casing A is reinforced by horizontally disposed top and bottom webs of well-known form. The inwardly diverging side walls 18 present interior opposed inwardly converging wedge faces 19—19.

The rear follower B comprises a main body 20 which is of rectangular plate-like form and co-operates with the rear stop lugs 12 in the usual manner. At the front side the plate 20 has a hollow enlargement 21 having forwardly converging exterior wedge faces 22—22 on the opposite sides thereof. The enlargement 21 is also provided with a flat front end face 23 forming an abutment for the rear end of the friction post D.

The friction shell C, which is interposed between the front and rear followers A and B is of substantially rectangular box-like form having horizontally disposed spaced top and bottom walls 24—24 and vertically disposed spaced side walls 25—25. The side walls 25 are curved as shown and present opposed, interior, rearwardly diverging true cylindrical friction surfaces 26—26 extending longitudinally of the mechanism. The shell C also has a transverse front end wall 27 provided with a central opening 120 adapted to slidingly accommodate the friction shoes E.

The friction post D is disposed centrally of the mechanism between the front and rear followers, within the friction shell. The post D has longitudinally disposed true cylindrical friction surfaces 28—28 on the opposite sides thereof, the faces 28 converging forwardly of the mechanism. At the rear end, the post is provided with flanges 29—29 on the opposite sides thereof adapted to co-operate with the pair of friction shoes F—F to be restored thereby to normal position after each compression stroke of the mechanism.

The friction shoes E which are disposed at the front end of the mechanism are of substantially like design, each shoe having a true cylindrical friction surface 128 on the inner side thereof adapted to co-operate with the corresponding friction surface 28 of the post D. At the front end, each shoe E has an outer flat wedge face 119 correspondingly inclined to and adapted to co-operate with the wedge face 19 at the corresponding side of the follower A. At the inner end, each shoe E is provided with a lateral projection 30 adapted to co-operate with the corresponding side wall section 27 of the casing C to effect restoration of the shell to normal position. As most clearly shown in Figures 2 and 4, each of the shoes E is cut away on a curve at the side thereof carrying the wedge face so that the same will properly clear the corresponding friction surface 26 of the shell C.

The two shoes F which are arranged at the rear end of the mechanism and co-operate with the follower B, are of substantially the same design as the shoes E, each having a flat inner wedge face 122 adapted to co-operate with the corresponding wedge face 22 of the follower B, a true cylindrical outer friction surface 126 adapted to co-operate with the friction surface 26 at the corresponding side of the shell C and a flange 31 at the inner side thereof adapted to co-operate with the flange 29 of the friction post D to limit the outward movement of the post.

The twin arranged main spring elements G, each unit of which preferably comprises a relatively heavy single coil, are interposed between the front and rear pairs of friction shoes E and F, each shoe E and F being provided with a boss on the inner end thereof adapted to extend into the corresponding end of one of the units of the twin arranged springs, to properly center the same.

The mechanism is held in assembled relation, of overall length and under initial compression by the retainer bolts H, which are two in number. The retainer bolts H are disposed at the top and bottom of the mechanism centrally thereof, each bolt having the head thereof anchored within the hollow projection 21 of the rear follower B, and the nut thereof anchored to the follower A. The post D is longitudinally slotted at the top and bottom to accommodate the shanks of the two bolts. The bolts are preferably so adjusted as to maintain the springs G under initial compression when the mechanism is in full release. As wear occurs on the various friction and wedge faces of the device, expansion of the springs G compensates for the same, holding the various friction and wedge faces always in intimate contact.

The operation of my improved shock absorbing mechanism, assuming a compression stroke, is as follows: The front and rear followers A and B will be moved relatively toward each other, thereby setting up a wedging action between the front follower A and the friction wedge shoes E, forcing the latter into intimate contact with the friction surfaces of the post D and carrying the same inwardly of the mechanism. At the same time, the springs G will be compressed, thereby transmitting the actuating force to the shoes C, setting up a wedging action between the shoes and the wedge B, whereby the last named shoes are forced into intimate frictional contact with the surfaces 26 of the friction shell. During initial compression of the mechanism, the springs G only will be compressed, the front follower A and the friction post D being free to move a limited distance with reference to the friction shell and the rear follower B respectively. After the preliminary action just described, the front follower A will engage the friction shell C, and the post will abut the flat end face 23 of the projection 21 of the follower B and have its movement limited with reference to said follower. During the remainder of the compression stroke, the shell will be forced rearwardly with reference to the friction shoes F slipping on the friction surfaces of the latter, and the friction shoes E will be forced to slide rearwardly on the friction surfaces of the post D. This action will continue until either the actuating force is reduced or until the rear end of the friction shell comes into abutment with the plate-like main body portion 20 of the rear follower B, whereby further compression of the main springs will be prevented and the actuating force transmitted directly through the followers and shell to the corresponding stop lugs on the draft sills. When the actuating force is reduced, the springs G will restore all of the parts to normal position, outward movement of the follower A with reference to the follower B being limited by the retainer bolts H, and outward movement of the shoes E being in turn limited by the follower A. During the outward movement of the shoes E, upon release, the shell will be carried outwardly and restored to normal position by the inter-engaging lugs 30 and 27 on the shoes E and shell C. Due to the friction existing between the shoes E and the post D, the latter will also be carried outwardly on release until its movement is limited by engagement of the flanges 29 thereof with the flanges 31 of the shoes F.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with front and rear relatively movable follower acting elements, one of said elements having exterior wedge faces thereon and the other element being provided with interior wedge faces; of a friction shell having limited movement relative to one of said followers and adapted to be engaged and moved thereby after a predetermined compression of the mechanism; a friction post having limited movement relative to the other follower; friction shoes having wedge faces, certain of said shoes having frictional engagement with said post and having the wedge faces thereof co-operating with the wedge faces of one of said follower elements, and freely movable relatively to the shell, the remaining friction shoes having frictional engagement with the shell and having the wedge faces thereof co-operating with the wedge faces of the other follower element; and means for yieldingly resisting relative movement of the friction shoes.

2. In a friction shock absorbing mechanism, the combination with front and rear, relatively movable follower elements, one of said elements having exterior wedge faces thereon and the other element being provided with interior wedge faces; of a friction member having limited movement with reference to one of said followers and adapted to be engaged and moved thereby after a predetermined compression of the mechanism; a second friction member having limited movement relative to the other follower; friction shoes having wedge faces, certain of said shoes having frictional engagement with the second named member and having the wedge face thereof co-operating with the wedge face of one of said follower elements and freely movable relative to the said first named member, the remaining friction shoes having frictional engagement with the first named member and having the wedge faces thereof co-operating with the wedge faces of the other follower element; and yielding means for resisting relative movement of the friction shoes.

3. In a friction shock absorbing mechanism, the combination with a pair of relatively movable followers; of a friction shell normally spaced from one of said followers and adapted to be engaged and moved thereby after a predetermined compression of the mechanism; a friction post co-operating with the other follower and having limited movement relative thereto; two pairs of friction shoes co-operating respectively with said friction shell and post, the shoes co-operating with the post having wedging engagement with one of said followers and being freely movable relatively to the shell, and the shoes co-operating with the shell having wedging engagement with the other follower; and yielding means resisting relative movement of said shoes.

4. In a friction shock absorbing mechanism, the combination with a follower having wedge faces; of a tapered friction shell normally slightly spaced from and adapted to be engaged and moved by said follower after a predetermined compression of the mechanism; a second follower having wedge faces; a longitudinally disposed tapered friction element interposed between said followers; a plurality of friction shoes, certain of said shoes having wedging engagement with one of said followers and frictional engagement with the friction element, and others of said shoes having wedging engagement with the other follower and frictional engagement with the shell; and a spring resistance interposed between said shoes and bearing directly on said shoes only.

5. In a friction shock absorbing mechanism, the combination with a friction shell having interior, curved friction surfaces; of a pair of relatively movable followers, one of said followers having exterior wedge faces and the other follower having interior wedge faces, said followers and shell being relatively movable, the movement between one of said followers and the shell being limited; a friction post having longitudinally disposed curved friction surfaces; a plurality of shoes, certain of which have friction surfaces co-operating with said post friction surfaces and wedge faces co-operating with the wedge faces of one of said followers and others of said shoes having friction surfaces engaging said shell friction surfaces and wedge faces co-operating with the wedge faces of the remaining follower, and means engaging the shoes only for yieldingly resisting relative movement thereof.

6. In a friction shock absorbing mechanism, the combination with a pair of relatively movable followers, one of said followers having interior wedge faces and the other follower having exterior wedge faces; of a friction shell normally spaced from one of said followers and adapted to be moved thereby after a pre-determined compression of the mechanism; a friction post having limited movement with reference to the other follower to provide for preliminary action; a set of friction shoes having wedge faces engaging with the wedge faces of one of said followers and friction surfaces co-operating with said post; a second set of friction shoes having friction engagement with the shell and wedging engagement with the other follower; and yielding means for transmitting the actuating force directly from one set of shoes to the other set.

In witness that I claim the foregoing I have hereunto subscribed my name this 9th day of September, 1925.

STACY B. HASELTINE.